US 11,780,647 B2

(12) United States Patent
Cairns

(10) Patent No.: US 11,780,647 B2
(45) Date of Patent: Oct. 10, 2023

(54) FOOD BAG CLOSURE ASSEMBLY

(71) Applicant: Robert Cairns, Dunedin, FL (US)

(72) Inventor: Robert Cairns, Dunedin, FL (US)

(*) Notice: Subject to any disclaimer, the term of this patent is extended or adjusted under 35 U.S.C. 154(b) by 553 days.

(21) Appl. No.: 17/072,770

(22) Filed: Oct. 16, 2020

(65) Prior Publication Data

US 2022/0119158 A1 Apr. 21, 2022

(51) Int. Cl.
*B65D 33/16* (2006.01)
*A47J 47/10* (2006.01)
*B65D 81/20* (2006.01)
*B65D 81/28* (2006.01)
*A23L 3/3409* (2006.01)

(52) U.S. Cl.
CPC ........ *B65D 33/1675* (2013.01); *A23L 3/3409* (2013.01); *A47J 47/10* (2013.01); *B65D 33/1658* (2013.01); *B65D 81/2084* (2013.01); *B65D 81/28* (2013.01)

(58) Field of Classification Search
CPC ............ B65D 33/1675; B65D 33/1658; B65D 81/2084; B65D 81/28; A23L 3/3409; A47J 47/10
See application file for complete search history.

(56) References Cited

U.S. PATENT DOCUMENTS

| | | | | |
|---|---|---|---|---|
| 3,939,287 | A * | 2/1976 | Orwig | B65B 55/18 426/316 |
| 5,480,030 | A * | 1/1996 | Sweeney | B65D 81/2038 206/524.8 |
| 5,802,677 | A * | 9/1998 | Dorman | B65D 33/1675 24/30.5 R |
| 6,363,588 | B1 * | 4/2002 | Caradine | B65D 33/1675 24/30.5 R |
| RE40,756 | E * | 6/2009 | Hall | B67B 7/30 30/294 |
| D598,279 | S * | 8/2009 | Seehoff | D8/395 |
| 7,614,203 | B2 * | 11/2009 | Oltrogge | B65B 31/047 53/139.2 |
| 7,762,047 | B2 * | 7/2010 | Stackley | B65B 43/34 53/574 |
| 8,020,360 | B2 * | 9/2011 | Biotti | F25C 5/182 62/331 |
| 10,874,255 | B2 * | 12/2020 | Losoya | A47J 37/1295 |
| 2006/0096468 | A1 * | 5/2006 | Paine | B65D 75/585 99/473 |
| 2015/0307217 | A1 * | 10/2015 | Fairbank | A23L 3/3418 53/512 |

FOREIGN PATENT DOCUMENTS

| | | | | |
|---|---|---|---|---|
| DE | 102007041730 A1 * | 3/2009 | ............. | A21D 15/00 |
| DE | 102014012365 A1 * | 2/2016 | ............... | A23B 4/02 |
| EP | 0841256 | 5/1998 | | |

\* cited by examiner

*Primary Examiner* — Nicolas A Arnett

(57) ABSTRACT

A food bag closure assembly includes a clip that has a pair of jaws being biased against each other for closing an opened food bag. A gas unit is provided that stores an inert gas and the gas unit is integrated into the clip. The gas unit is in fluid communication with an interior of the food bag when the clip is positioned on the food bag. Moreover, the gas unit is actuated to release a pre-determined volume of the inert gas each time the clip is closed. In this way the gas unit injects the inert gas into the food bag for extending the shelf life of food contained in the food bag.

11 Claims, 3 Drawing Sheets

FOOD BAG CLOSURE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to closure devices and more particularly pertains to a new closure device for closing a food bag and injecting an inert gas into the food bag for enhancing freshness of food in the food bag.

(2) Description of Related Art Including Information Disclosed Under 37 CFR 1.97 and 1.98

The prior art relates to closure devices including a bag clamp that has a cutter integrated therein. The prior art discloses a variety of bag closure clips that include a pair of jaws biased together for closing an opened food bag. The prior art discloses a variety of appliances for filling a food storage environment with an inert gas for enhancing freshness of food in the food storage environment.

BRIEF SUMMARY OF THE INVENTION

An embodiment of the disclosure meets the needs presented above by generally comprising a clip that has a pair of jaws being biased against each other for closing an opened food bag. A gas unit is provided that stores an inert gas and the gas unit is integrated into the clip. The gas unit is in fluid communication with an interior of the food bag when the clip is positioned on the food bag. Moreover, the gas unit is actuated to release a pre-determined volume of the inert gas each time the clip is closed. In this way the gas unit injects the inert gas into the food bag for extending the shelf life of food contained in the food bag.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
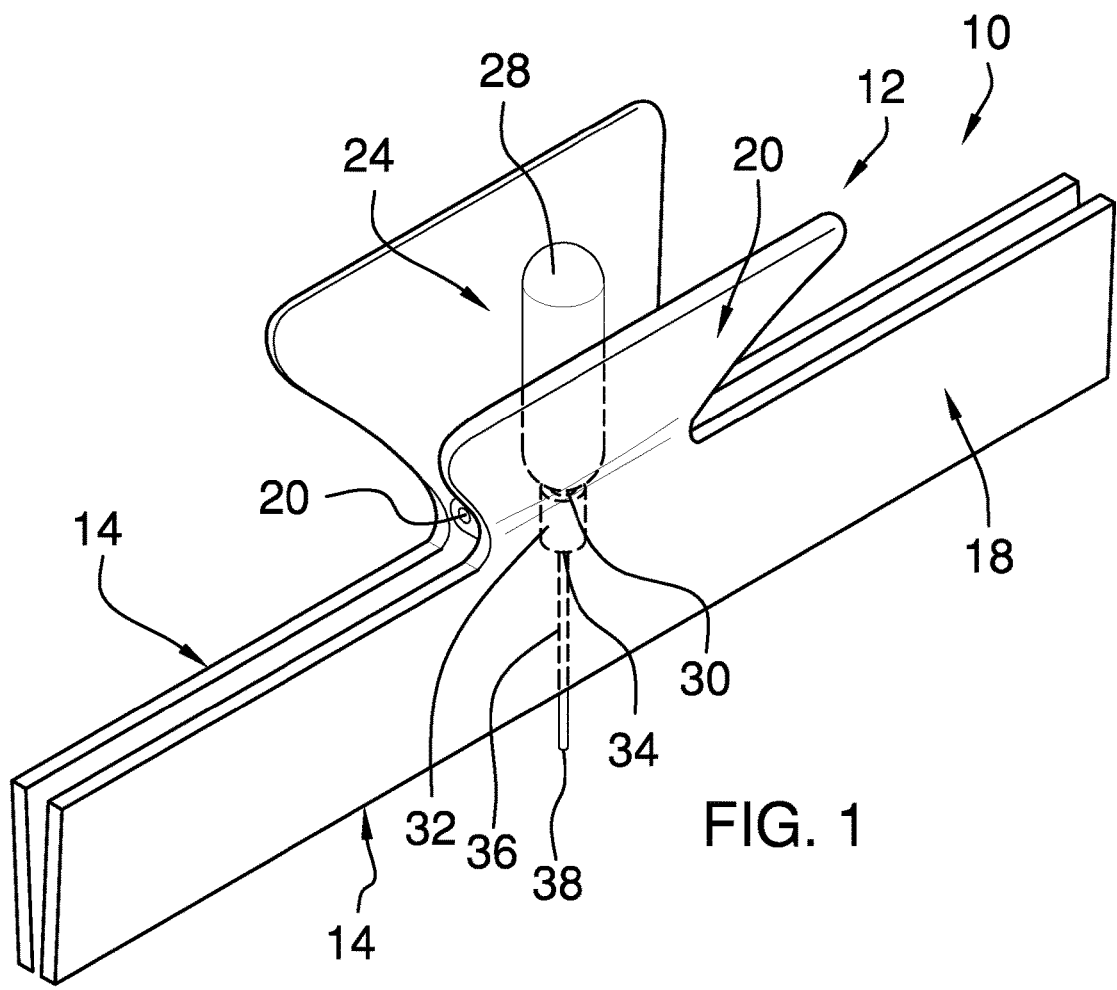
FIG. 1 is a perspective phantom view of a food bag closure assembly according to an embodiment of the disclosure.
Figure 2:
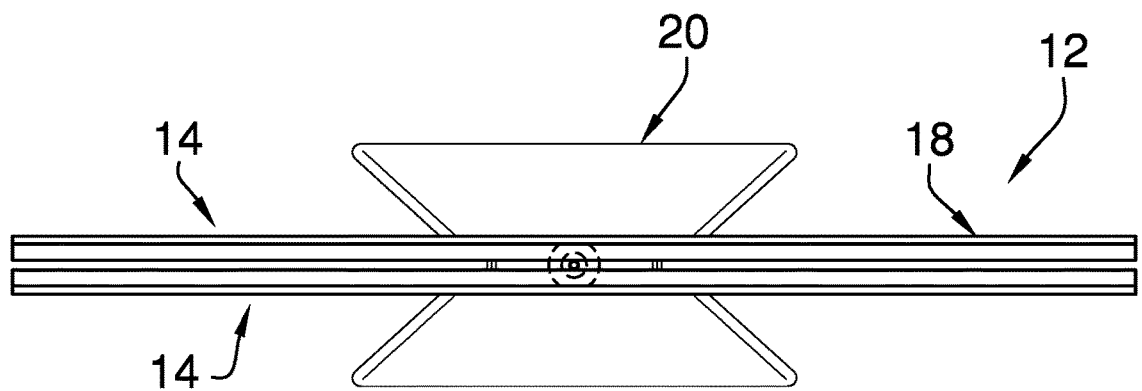
FIG. 2 is a bottom phantom view of an embodiment of the disclosure.
Figure 3:
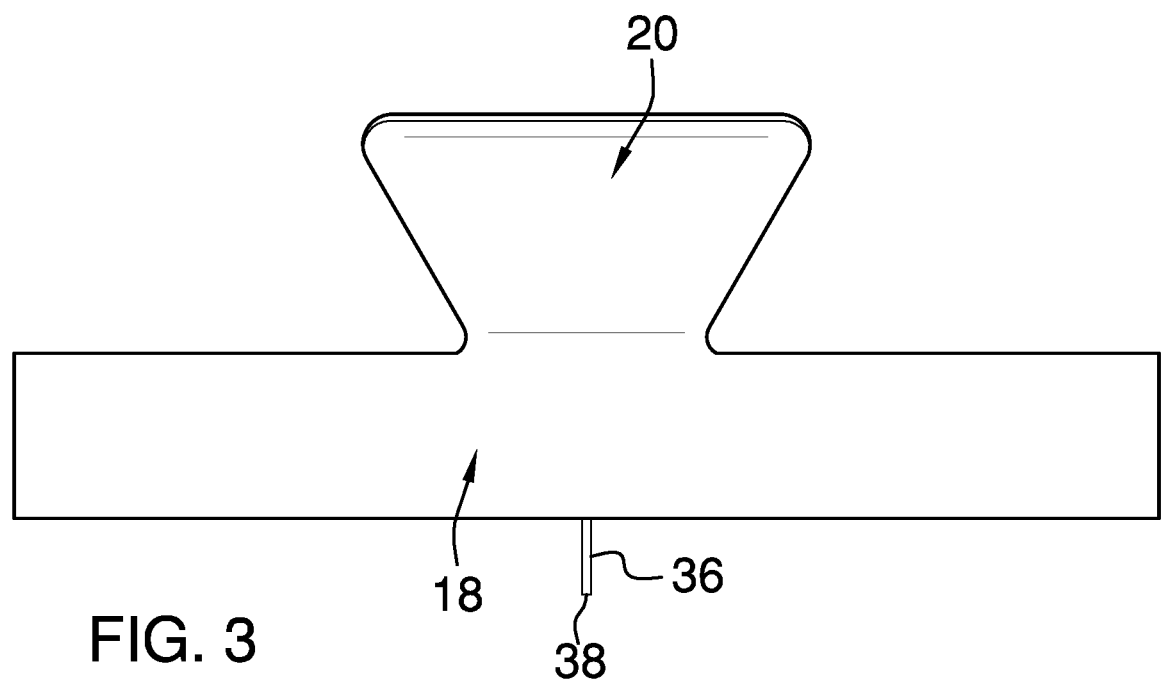
FIG. 3 is a front view of an embodiment of the disclosure.
Figure 4:
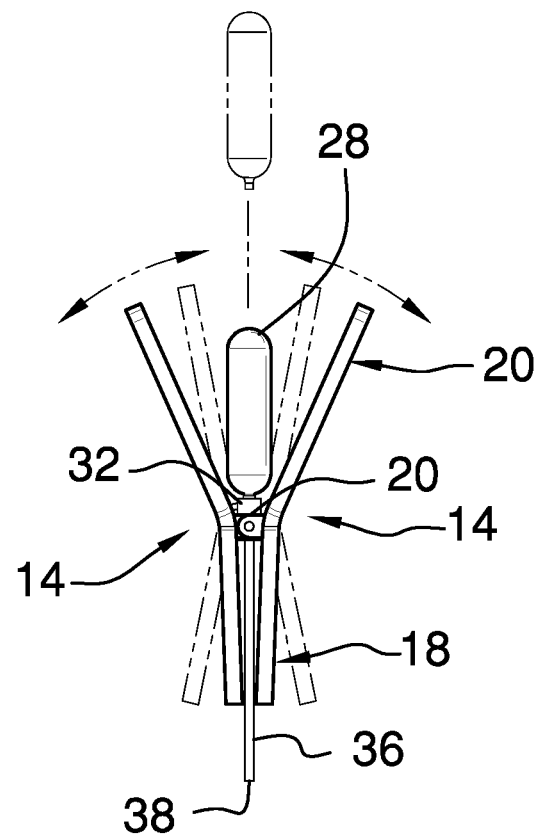
FIG. 4 is a right side view of an embodiment of the disclosure.
Figure 5:
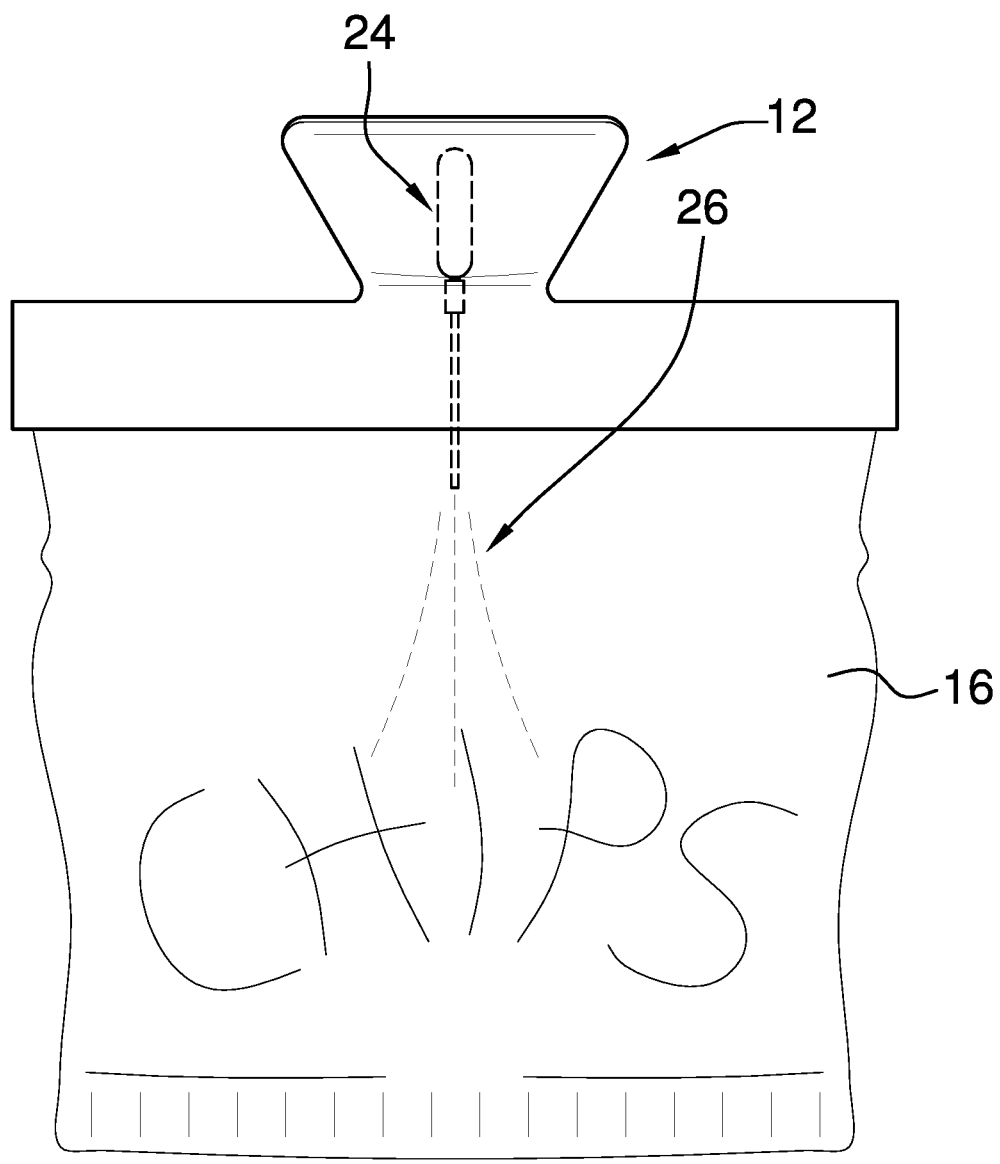
FIG. 5 is a phantom in-use view of an embodiment of the disclosure.

With reference now to the drawings, and in particular to FIGS. 1 through 5 thereof, a new closure device embodying the principles and concepts of an embodiment of the disclosure and generally designated by the reference numeral 10 will be described.

As best illustrated in FIGS. 1 through 5, the food bag closure assembly 10 generally comprises a clip 12 that has a pair of jaws 14 that are biased against each other to close an opened food bag 16. The food bag 16 may be a potato chip bag or other similar type of food bag that does not have a closure. Each of the jaws 14 has an elongated portion 18 and a wing portion 20 angling upwardly from the elongated portion 18. The clip 12 includes a pivot 22 and each of the jaws 14 is pivotally coupled to the pivot 22. Moreover, the elongated portion 18 of each of the jaws 14 is aligned with each other and is urged toward each other when the pivot 22 biases the jaws 14 into a closed position. The wing portion 20 on each of the jaws 14 angles away from each other when the pivot 22 biases the jaws 14 into the closed position. In this way the wing portion 20 on each of the jaws 14 can be gripped by a user to urge the jaws 14 into an open position having the elongated portion 18 of each of the jaws 14 being spaced apart from each other.

A gas unit 24 is provided and the gas unit 24 stores an inert gas 26 such as argon or nitrogen. The gas unit 24 is integrated into the clip 12 and the gas unit 24 is in fluid communication with an interior of the food bag 16 when the clip 12 is positioned on the food bag 16. Moreover, the gas unit 24 actuated to release a pre-determined volume of the inert gas 26 each time the clip 12 is closed. In this way the gas unit 24 can inject the inert gas 26 into the food bag 16 for extending the shelf life of food contained in the food bag 16.

The gas unit 24 comprises a canister 28 for containing the inert gas 26 and the canister 28 has an outlet 30. The gas unit 24 includes a valve 32 that is fluidly coupled to the outlet 30 of the canister 28 such that the valve 32 receives the inert gas 26. The valve 32 has an output 34 and the valve 32 is actuatable into an open condition such that the valve 32 releases the pre-determined volume of the inert gas 26 from the canister 28. The valve 32 is operationally coupled to the pivot 22 in the clip 12 and the valve 32 is actuated into the open condition when the pivot 22 rotates in a direction corresponding to the clip 12 is closed. The valve 32 may be a mechanically operated gas valve or the like that automatically releases a pre-determined volume of gas each time the valve is mechanically operated. Additionally, as is most clearly shown in FIG. 4, the canister 28 may be removably attachable to the valve 32 such that the canister 28 can be replaced when the inert gas 26 is depleted.

A tube 36 is fluidly coupled to the valve 32 such that the tube 36 receives the inert gas 26 from the valve 32. The tube 36 extends downwardly between the elongated portions 18 of each of the jaws 14. In this way the tube 36 can extend into the food bag 16 when the clip 12 is positioned on the food bag 16. The tube 36 has a distal end 38 with respect to the valve 32 and the distal end 38 is positioned in the food bag 16 when the clip 12 is closed. In this way the tube 36 can release the inert gas 26 into the food bag 16.

In use, the clip 12 is lowered onto the open food bag 16 such that the tube 36 extends into the open food bag 16. The clip 12 is released to facilitate the pivot 22 to close the jaws 14 onto the open food bag 16 for closing the open food bag 16. Additionally, the predetermined volume of inert gas 26 is injected into the open food bag 16 to displace air in the open food bag 16. In this way the food in the open food bag 16 is inhibited from becoming stale and thusly extending the shelf life of the food.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A food bag closure assembly for injecting an inert gas into a food bag prior to closing the food bag for extending the shelf life of food contained in the food bag, said assembly comprising:
   a clip having a pair of jaws being biased against each other wherein said clip is configured to close an opened food bag; and
   a gas unit storing an inert gas, said gas unit being integrated into said clip wherein said gas unit is configured to be in fluid communication with an interior of the food bag when said clip is positioned on the food bag, said gas unit being actuated to release a pre-determined volume of said inert gas each time said clip is closed wherein said gas unit is configured to inject said inert gas into the food bag for extending the shelf life of food contained in the food bag.

2. The assembly according to claim 1, wherein said each of said jaws has an elongated portion and a wing portion angling upwardly from said elongated portion.

3. The assembly according to claim 2, wherein said clip includes a pivot having each of said jaws being pivotally coupled thereto.

4. The assembly according to claim 3, wherein said elongated portion of each of said jaws is aligned with each other and is urged toward each other when said pivot biases said jaws into a closed position.

5. The assembly according to claim 3, wherein said wing portion on each of said jaws angles away from each other when said pivot biases said jaws into said closed position wherein said wing portion on each of said jaws is configured to be gripped by a user to urge said jaws into an open position having said elongated portion of each of said jaws being spaced apart from each other.

6. The assembly according to claim 1, wherein said gas unit comprises a canister containing said inert gas, said canister having an outlet.

7. The assembly according to claim 6, wherein said gas unit includes a valve being fluidly coupled to said outlet of said canister such that said valve receives said inert gas, said valve having an output, said valve being actuatable into an open condition such that said valve releases said pre-determined volume of said inert gas from said canister.

8. The assembly according to claim 7, wherein:
   said clip includes a pivot; and
   said valve being operationally coupled to said pivot in said clip, said valve being actuated into said open condition when said pivot rotates in a direction corresponding to said clip being closed.

9. The assembly according to claim 8, wherein:
   each of said jaws includes an elongated portion; and
   said gas unit includes a tube being fluidly coupled to said valve such that said tube receives said inert gas from said valve, said tube extending downwardly between said elongated portion of each of said jaws wherein said tube is configured to extend into the food bag when said clip is positioned on the food bag.

10. The assembly according to claim 9, wherein said tube has a distal end with respect to said valve wherein said distal end is configured to be positioned in the food bag when said clip is closed thereby facilitating said tube to release said inert gas into the food bag.

11. A food bag closure assembly for injecting an inert gas into a food bag prior to closing the food bag for extending the shelf life of food contained in the food bag, said assembly comprising:
   a clip having a pair of jaws being biased against each other wherein said clip is configured to close an opened food bag, said each of said jaws having an elongated portion and a wing portion angling upwardly from said elongated portion, said clip including a pivot having each of said jaws being pivotally coupled thereto, said elongated portion of each of said jaws being aligned with each other and being urged toward each other when said pivot biases said jaws into a closed position, said wing portion on each of said jaws angling away from each other when said pivot biases said jaws into said closed position wherein said wing portion on each of said jaws is configured to be gripped by a user to urge said jaws into an open position having said elongated portion of each of said jaws being spaced apart from each other; and a gas unit storing an inert gas, said gas unit being integrated into said clip wherein said gas unit is configured to be in fluid communication with an interior of the food bag when said clip is positioned on the food bag, said gas unit being actuated to release a pre-determined volume of said inert gas each time said clip is closed wherein said gas unit is configured to inject said inert gas into the food bag for extending the shelf life of food contained in the food bag, said gas unit comprising:

a canister containing said inert gas, said canister having an outlet;

a valve being fluidly coupled to said outlet of said canister such that said valve receives said inert gas, said valve having an output, said valve being actuatable into an open condition such that said valve releases said pre-determined volume of said inert gas from said canister, said valve being operationally coupled to said pivot in said clip, said valve being actuated into said open condition when said pivot rotates in a direction corresponding to said clip being closed; and a tube being fluidly coupled to said valve such that said tube receives said inert gas from said valve, said tube extending downwardly between said elongated portion of each of said jaws wherein said tube is configured to extend into the food bag when said clip is positioned on the food bag, said tube having a distal end with respect to said valve wherein said distal end is configured to be positioned in the food bag when said clip is closed thereby facilitating said tube to release said inert gas into the food bag.

\* \* \* \* \*